United States Patent [19]
Loetel et al.

[11] 3,733,063
[45] May 15, 1973

[54] CHEVRON RIBBED FILL UNIT FOR WATER COOLING TOWER

[75] Inventors: Charles E. Loetel; William H. Lebo; Dougan L. Jones, all of Mission, Kans.

[73] Assignee: The Marley Company, Kansas, Mo.

[22] Filed: Sept. 24, 1971

[21] Appl. No.: 183,471

[52] U.S. Cl. .......................... 261/112, 261/DIG. 11
[51] Int. Cl. ................................................ B01f 3/04
[58] Field of Search ...................... 261/112, 111, 110, 261/109, 108, 30, DIG. 11, 95, 98, 94

[56] References Cited

UNITED STATES PATENTS

| | | | |
|---|---|---|---|
| 348,917 | 9/1886 | Kniese | 261/112 UX |
| 2,793,017 | 5/1957 | Lake | 261/112 |
| 3,286,999 | 11/1966 | Takeda | 261/30 |
| 3,395,903 | 8/1968 | Norback et al. | 261/DIG. 11 |
| 3,540,702 | 11/1970 | Uyama | 261/112 |
| 3,599,943 | 8/1971 | Munters | 261/95 |

Primary Examiner—Dennis E. Talbert, Jr.
Attorney—Shmidt, Johnson, Hovey and Williams

[57] ABSTRACT

A thin, self-sustaining, corrugated plate of polyvinyl chloride is strengthened against bending along its lines of weakness by stiffening structure extending vertically of the plate within the thickness confines of the corrugations to minimize airflow impedance. One embodiment utilizes rovings of fiber glass strands saturated with polyester resin which are placed within troughs cut through the corrugations, the resin then hardening to stiffen the roving and bond it to the plate. A second embodiment has sets of side-by-side stiffening channels integrally formed into the body of the plate. A third embodiment employs a wood brace complementally received within each channel of a series of single stiffening channels to augment the strengthening properties of the channels and to support the plate when the braces are suspended from above or stood on a flat, underlying surface. A fourth embodiment uses a transversely U-shaped metal brace in place of the rectangular wood brace of the third embodiment.

19 Claims, 20 Drawing Figures

PATENTED MAY 15 1973 3,733,063

Charles E. Loetel
William H. Lebo
Dougan L. Jones
INVENTORS.

BY
Schmidt, Johnson, Hovey & Williams
ATTORNEYS.

Charles E. Loetel
William H. Lebo
Dougan L. Jones
INVENTORS.

BY
Schmidt, Johnson, Hovey & Williams
ATTORNEYS.

PATENTED MAY 15 1973 3,733,063

Charles E. Loetel
William H. Lebo
Dougan L. Jones
INVENTORS.

BY Schmidt, Johnson,
Horry & Williams
ATTORNEYS.

CHEVRON RIBBED FILL UNIT FOR WATER COOLING TOWER

This invention relates broadly to water cooling towers and, more particularly, to the packing assembly in such towers which provides a broad surface area over which heated water may spread for subsequent air cooling by air currents flowing between the adjacent fill units of the assembly.

Several factors must be considered in designing a packing assembly which will most effectively and efficiently carry out the cooling process. Of major importance is the goal of spreading water from the hot water basin of the tower over the maximum amount of surface area possible within the space limitations provided in order to expose the water to the cooling effects of airstreams flowing between fill units of the assembly. Yet, as the same time, it is important that the increase in available surface area be accomplished in a manner which does not impede airflow to such an extent that the water is not cooled to its desired temperature by the time it reaches the cold water basin below the packing assembly. Another consideration is to effect turbulation of the water and slow its flow for the maximum effective contact time.

To increase the surface area of the plate-like fill units, the body of each plate may be corrugated with sets of zigzag chevron patterns on the opposed surfaces of the plates. Inasmuch as the vertical sides of the plates provide the only substantial areas of contact for the water, and in order to minimize the weight of the packing assembly, it is desirable that the individual plates be constructed from relatively thin material, such as sheets of polyvinyl chloride. When using this material it has been found that the corrugations may be most easily produced by a vacuum-forming process wherein selected areas of the originally flat sheet are subjected to instantaneous vacuum pressure to draw such areas into cavities within a special forming die, thereby creating the desired pattern of ridges and furrows within the body of the sheet.

Moreover, it is important from a cost standpoint that the sheets are as thin as possible, yet are of sufficient thickness to withstand the forces generated during the vacuum-forming processes without splitting or opening at points of great stress concentration. Further limiting the thinness of each sheet is the fact that its vertical strength is reduced in proportion to the reduction in thickness thereof and, because of the alignment of apexes of the corrugations in each chevron pattern, lines of weakness are presented about which the sheets tend to bend and buckle when the sheets are loaded with water. Manifestly, this tendency to bend and buckle is magnified as the lower extremity of each sheet is approached. Moreover, because of the thermoplastic quality of polyvinyl chloride, the sheets have an increased tendency to sag and bend as the heated water spreads over the surfaces of the sheet. In this respect, it is not unusual for the sheets to encounter water issuing from the hot water basin at temperatures in excess of 100° F.

Therefore, in view of the factors set forth above, it is the primary goal of the present invention to provide a fill unit which is designed to provide optimum service by minimizing material and construction costs, by minimizing the static pressure drop of air flowing through the packing assembly while optimizing turbulence of air and time retention of water, and by maximizing the surface area available for coverage by the heated water, all the while overcoming the inherent tendency of the unit to bend and buckle under water-loading conditions.

In furtherance of this goal, an important object of the present invention is to provide stiffeners for each fill unit constructed of rovings of fiber glass strands which have been saturated with fluid polyester resin and deposited in receiving troughs in the unit for subsequent curing of the resin to produce rigid, column-like braces bonded to the unit and totally disposed within the thickness confines of the corrugations to minimize impedance to airflow across the corrugations.

A further important object of the invention is the provision of ledges on each of the stiffeners along the entire length thereof which are formed by the resin when the latter is in a fluid state and capable of flowing into the valleys presented by adjacent corrugations for ultimately providing uniform lifting support for the fill unit along the length of the stiffener.

Another important object of the instant invention is the provision of openings in each of the stiffener-receiving troughs in the unit which allow the resin, in a fluid state, to flow from one side to the opposite side of the unit for the creation of auxiliary button-like retainers on the backside of the unit which are integral with the stiffener when the resin is cured.

An additional important object of the invention is to provide an alternative method of furthering the above-mentioned goal through the provision of a series of normally vertically extending, horizontally spaced stiffening channels integrally formed into the body of each fill unit which are totally disposed within the thickness confines of the corrugated unit.

A still further important object of the present invention in furtherance of the above goal is to provide a stiffening channel which complementally receives a rigid, heat-resistant brace to augment the strengthening quality of the channel while presenting a means for supporting the unit, either by standing the brace on a flat surface or by suspending the brace from overhead structure.

Yet another equally important object of the invention is the provision of alternative configurations and materials of construction for the aforesaid brace, as well as alternative means of securing the brace within the stiffening channel.

Figure 1:
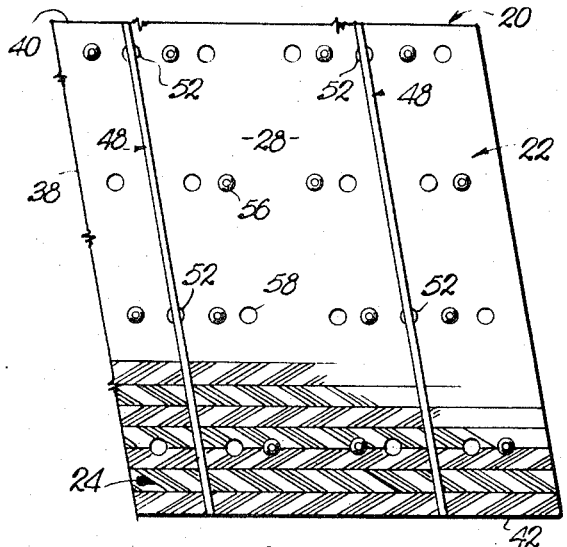
FIG. 1 is a fragmentary, elevational view of one embodiment of a stiffened fill unit constructed in accordance with the teachings of the present invention.

The fill unit 20 includes a sheet-like plate 22 of semirigid material, preferably polyvinyl chloride, which is ultimately grouped with a series of similar upstanding, spaced-apart plates to present a packing assembly. The body of the plate 22 is corrugated in a zigzag manner, such as by a vacuum-forming process, to present elongated, pyramid-like, normally vertically extending ridges 24 on each side 28 and 30 of plate 22 arranged in elongated, normally horizontally extending sets of chevron patterns. The converging end-to-end sections of each ridge 24 within a chevron pattern define an apex 32 such that each chevron set presents a central line of weakness extending through the aligned apexes 32. Each ridge 24 presents a pair of downwardly sloping sidewalls 34 diverging at an included angle of between 70° and 80°.

The plate 22 defines a parallelogram with the side edges 38 thereof inclined with respect to the top edge 40 and bottom edge 42, such inclination of side edges 38 being provided because of the "water pullback" phenomena which is experienced by a packing assembly during operation of the cooling tower.

Figure 2:
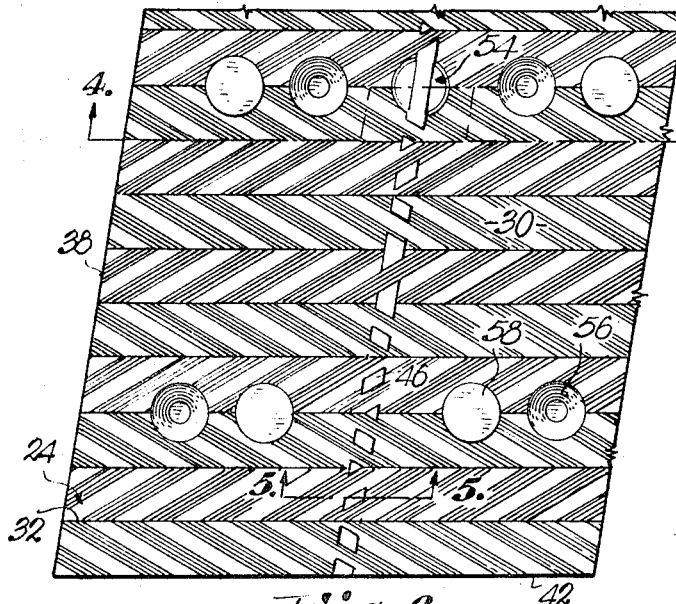
FIG. 2 is an enlarged, fragmentary elevational view of the reverse side of the fill unit in FIG. 1.
Figures 6, 7:
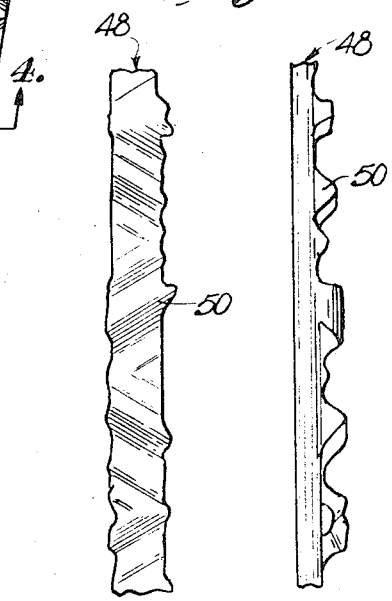
FIG. 6 is an enlarged, fragmentary view of the stiffener utilized in the first embodiment of the invention.
FIG. 7 is an elevational view of the stiffener rotated 90° from the position of FIG. 6 and showing in particular the projecting ledges of the stiffener.
Figure 5:
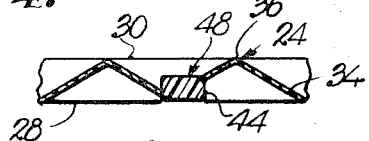
FIG. 5 is an enlarged, fragmentary, cross-sectional view of the unit taken along line 5—5 of FIG. 2.

Plate 22 has a normally vertically extending receiving trough 44 formed in side 28 thereof (FIG. 5) by sawing partially through certain of the ridges 24 of side 28. This results in a series of longitudinally spaced openings 46 being presented in the trough 44 as shown in FIG. 2, such openings 46 clearing portions of what would otherwise be the bottom of trough 44 as well as portions which would otherwise be sidewalls thereof. Trough 44, therefore, extends across the void areas between adjacent sections of the ridges 24 and through the body of such ridges and is disposed in parallelism with the side edges 38.

Received within each of the troughs 44 is a substantially rigid, column-like stiffener 48 which is constructed of rovings, preferably of fiber glass filaments saturated with a resin, preferably polyester. The stiffener 48 is produced by initially pulling several individual strands containing a large number of individual fiber glass filaments through a resin bath to thoroughly soak each strand. The strands are then merged together and pulled through a circular stripping die beneath the surface of the resin bath to thoroughly impregnate the merged strands with resin, whereupon the thoroughly saturated assembly of strands, or hanks, is deposited in one of the troughs 44 and stretched slightly to maintain the filaments in a relatively taut condition. Thereupon, the saturated hanks are cured at approximately 150° to 200° F., using a catalyst with the resin and a shielded heating unit such that only the saturated hanks receive heat and not the surrounding areas of the plate 22.

It is important to note that the dripping saturated condition of each hank, when it is placed in a trough 44, causes the resin to flow beyond trough 44 into the adjacent void areas between ridges 24 along the length of the hank. Thus, once the resin has cured, the hardened surplus flow of the resin takes the form of generally prism-shaped ledges 50 on the underside of the now solid stiffener 48. The ledges 50 correspond in shape and angularity to converging walls 34 of adjacent ridges 24 and are disposed at spaced intervals along the length of a stiffener 48, serving the important function of providing uniform lifting support to plate 22 all along the length of stiffener 48. In addition, the intimate contact between ledges 50 and the walls 34 of the ridges 24 during the period that ledges 50 are in a fluid condition causes ledges 50 to tightly adhere to the plate 22 once the resin has cured, thereby bonding the entire stiffener 48 to plate 22.

Figure 3:
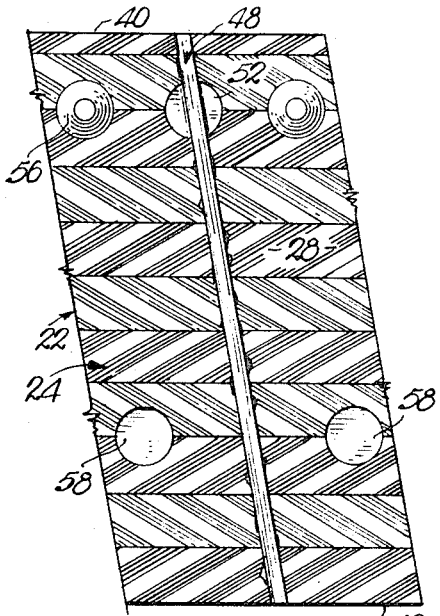
FIG. 3 is an enlarged, fragmentary elevational view of the unit with the same side exposed as is shown in FIG. 1.
Figure 4:
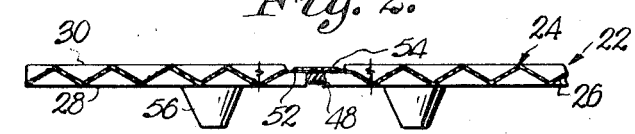
FIG. 4 is a fragmentary, cross-sectional view of the unit taken along line 4—4 of FIG. 2.

Also of importance is the fact that the openings 46 along trough 44 permit the resin to flow therethrough onto side 30 of plate 22 when the resin is in a fluid state, whereupon the resin cures to aid in retaining the stiffener 48 in place. In this connection, it is preferred that a number of relatively shallow depressions 52 (FIGS. 1, 3 and 4) be provided on side 28 along the length of trough 44 below ridges 24 and that the saw cut forming trough 44 completely sever depression 52. Thus, excess fluid resin flows through the cut in each depression 52 to cover the opposite surface thereof on side 30, forming a retaining button 54 (FIGS. 2 and 4) which, when cured, is integral with the stiffener 48.

Each stiffener 48 extends in a generally vertical direction when the plate 22 is in use for the entire vertical length of plate 22, thereby extending transversely of and intersecting the lines of weakness of the chevron sets. Through the provision of troughs 44, each stiffener 48 is completely confined within the outer margins of the corrugations as defined by the ridges 24 on sides 28 and 30. Thus, impedance to airflow across ridges 24 is held to a minimum.

It is contemplated that a series of the units 20 be joined together in side-by-side relationship to present the complete packing assembly and, in order to assure proper spacing between adjacent units 20, each unit 20 is provided with regularly spaced pairs of knobs 56 and plateaus 58. All of the knobs 56 project outwardly beyond the ridges 24 on side 28 of the plate 22, while all of the plateaus 58 are disposed substantially flush with the ridges 24 on the opposite side 30 of the plate 22. Each plateau 58 is disposed closely adjacent a neighboring knob 56, and each knob 56 and plateau 58 is intersected by the line of weakness of a chevron set. The knobs 56 and plateaus 58 are arranged such that it is necessary to rotate alternate units 180° within their own planes when the units 20 are grouped together to present the packing assembly as shown in FIG. 10 in order to cause the knobs 56 of one unit 20 to engage and bear against the plateaus 58 of the next adjacent unit 20.

Preferably, the knobs 56 are to be bonded to the plateaus 58 of the next adjacent unit 20 and, in this manner, the self-sustaining nature of the packing assembly is increased inasmuch as the interconnection between adjacent units 20 decreases the unbraced length of each stiffener 48. Thus, the units cooperate with one another in resisting bending or buckling under the load of the water.

With the units 20 disposed in an upright manner, as shown in FIG. 1, and with the lowermost edges 42 thereof resting upon a supporting surface, heated water entering the packing assembly from an overhead hot water basin crosses the uppermost edge 40 of each unit 20 and spreads over the sides 28 and 30 thereof while gravitating toward the lowermost edge 42 in a zigzag course of travel defined by the corrugations. Air passing between adjacent units 20 in the packing assembly cools the water and is substantially unimpeded in its flow because of the limited dimensions of the stiffeners 48. Some turbulence is created because of the presence of the knobs 56: however, this turbulence simply increases the "scrubbing" effect of the air and does not significantly increase the pressure drop of the air as measured at the entry and exhaust sides of the packing assembly. Thus, the cooling effectiveness of the packing assembly is maximized by the provision of the corrugations, yet the tendency of each unit 20 to bend about its lines of weakness is held to a minimum due to the reinforcing properties of the stiffeners 48.

Figure 8:
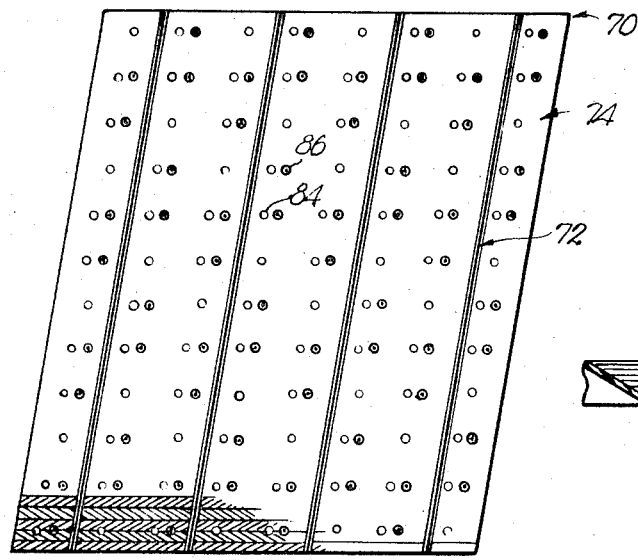
FIG. 8 is an elevational view of another embodiment of the present invention.
Figure 11:
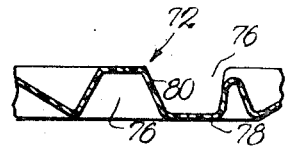
FIG. 11 is a fragmentary, full-scale, cross-sectional view through one of the stiffeners in the unit taken along line 11—11 of FIG. 9.
Figure 12:
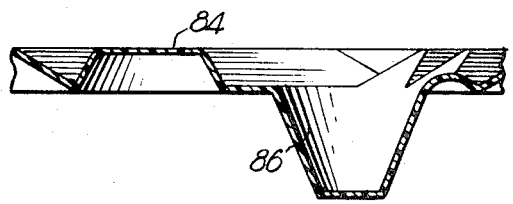
FIG. 12 is a fragmentary, full-scale, cross-sectional view of a knob and adjacent plateau of the unit taken along line 12—12 of FIG. 9.
Figure 9:
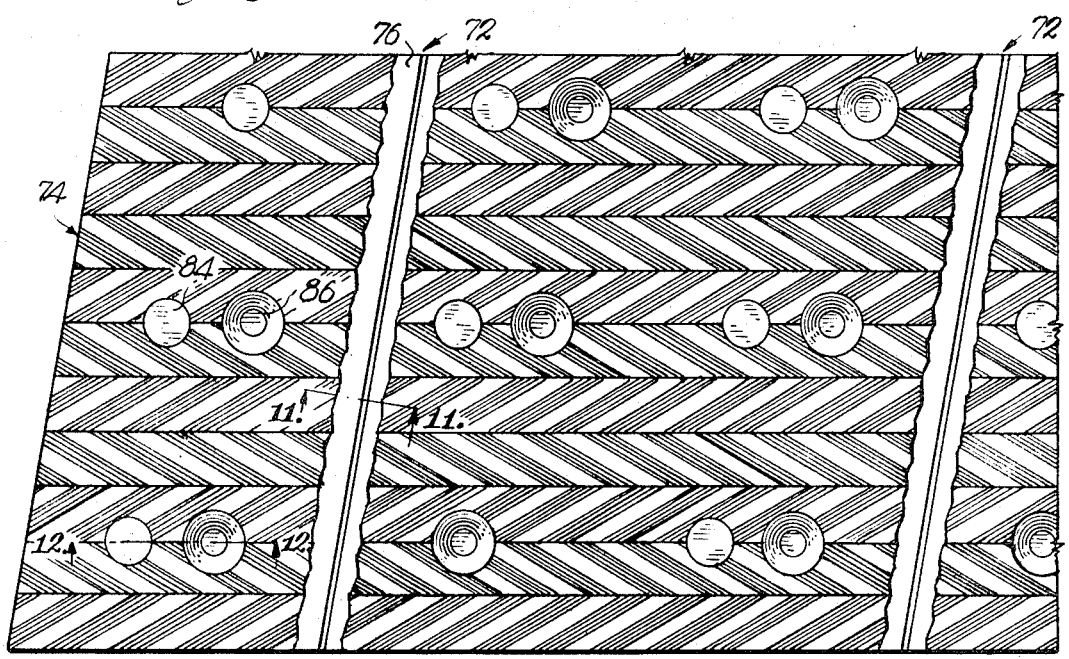
FIG. 9 is an enlarged, fragmentary elevational view of the lower left-hand corner of the fill unit of FIG. 8.
Figure 10:
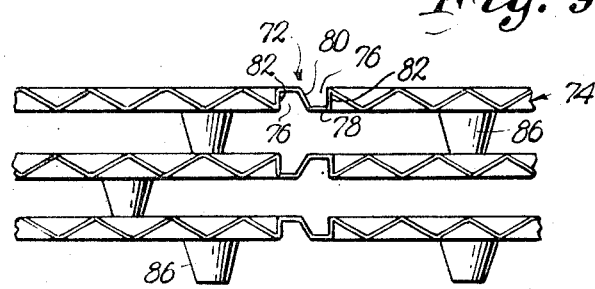
FIG. 10 is an enlarged, fragmentary end view of a number of the fill units joined together to present a portion of the packing assembly.

FIGS. 8–10 relate to a second embodiment of the invention which performs the same stiffening function as that taught in the first embodiment but in a slightly different manner. In this case, the unit 70 has stiffeners 72 which are integral with the body of plate 74 of unit 70 and do not utilize an externally added brace such as the stiffener 48 of the first embodiment. Instead, each of the stiffeners 72 is generally Z-shaped, presenting a pair of juxtaposed, oppositely opening and substantially identical strengthening channels 76 having floors 78 which are interconnected by a common central wall 80 inclined with respect to the floors 78. Each channel 76 extends the full vertical length of plate 74 providing vertical strength to the plate 74 without external assistance. The inclined nature of the common central wall 80 extends the strengthening properties of channels 76 laterally beyond the extent which would be possible with a 90° intersection of the central wall 80 with floors 78. In contrast to the trough 44 of the first embodiment, which was open along its longitudinal sides and at several points along the bottom thereof, the channels 76 are each provided with a sidewall 82 which extends upwardly from the respective floor 78 to close the proximal end of a corrugation without presenting an opening. Thus, it will be appreciated that the channels 76 actually serve to strengthen the plate 74, while the troughs 44 serve only to receive the stiffeners 48.

The chevron patterns of the corrugations for plate 74 are identical in configuration and arrangement with those of the first embodiment and, accordingly, the description thereof need not be repeated hereinafter. Moreover, the plateaus 84 and knobs 86 are identical with those of the first embodiment such that their description also need not be repeated.

Figure 13:
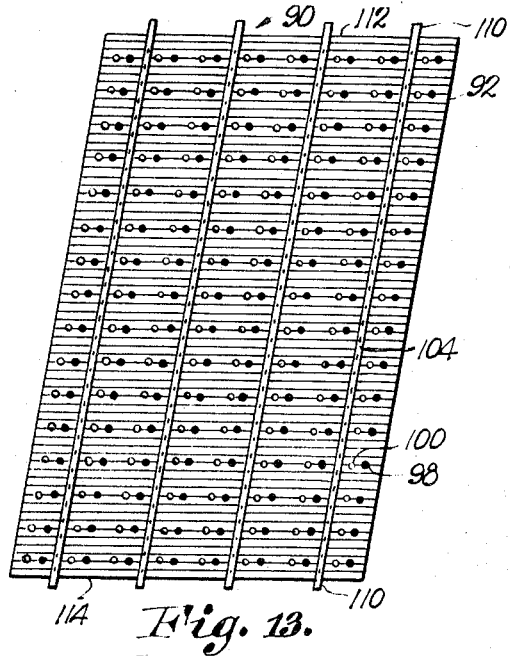
FIG. 13 is an elevational view of an additional embodiment of the fill unit which utilizes a brace in the nature of a wood bar to augment the strengthening properties of the stiffener.
Figure 14:
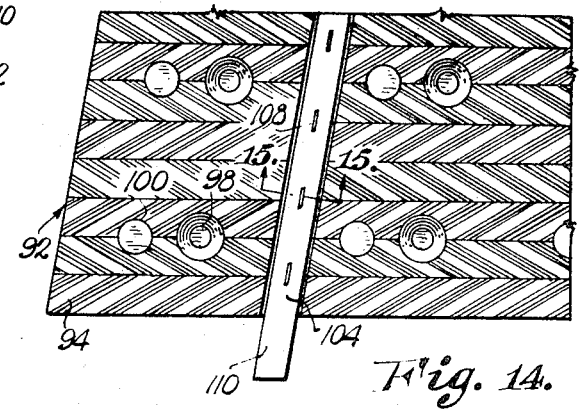
FIG. 14 is a fragmentary, enlarged, elevational view of the unit of FIG. 13.
Figure 15:
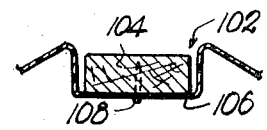
FIG. 15 is a fragmentary, full-scale cross-sectional view of the unit taken along line 15—15 of FIG. 14.
Figure 16:
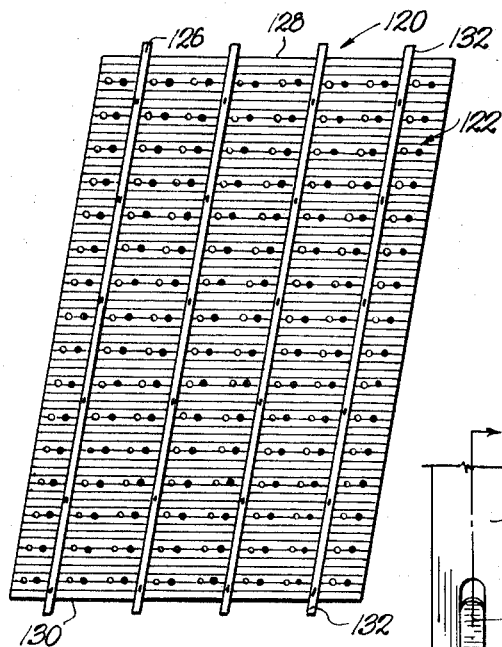
FIG. 16 is an elevational view of a further embodiment of the unit which utilizes a brace in the nature of a U-shaped metal bar.
Figure 17:
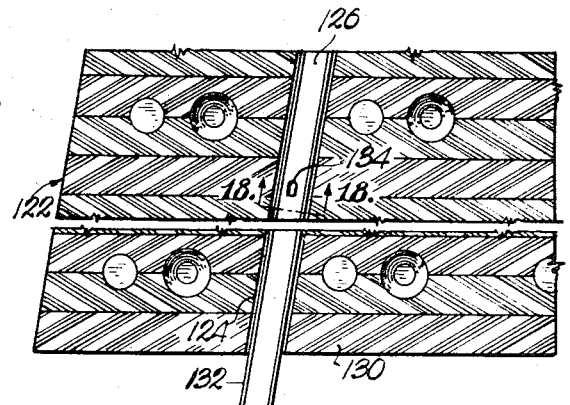
FIG. 17 is an enlarged, fragmentary elevational view of the unit of FIG. 16.
Figure 18:
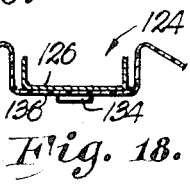
FIG. 18 is a fragmentary, full-scale, cross-sectional view of the unit taken along line 18—18 of FIG. 17.
Figure 19:
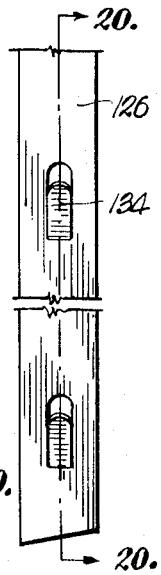
FIG. 19 is a fragmentary, approximately full-scale elevational view of the metal bar.
Figure 20:
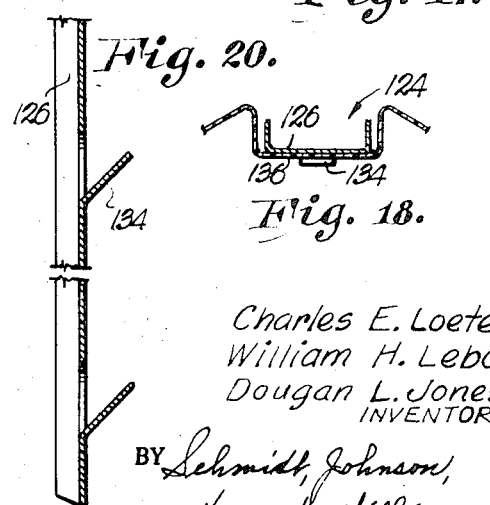
FIG. 20 is a fragmentary, vertical cross-sectional view of the bar taken along line 20—20 of FIG. 19.

FIGS. 13–15 relate to a third embodiment of the invention which is identical in many respects to the embodiment of FIGS. 8–10. Accordingly, only those details of construction which differ from the second embodiment will be described in detail.

The fill unit 90 has a plate 92, the body of which is corrugated in the same manner as the plates 22 and 74 of the first two embodiments with horizontally extending sets of chevron patterns presenting ridges 94 on both sides of the plate 92. Similarly, the plate 92 is provided with groups of knobs 98 and plateaus 100.

The principal distinction between the second and third embodiments lies in the structural differences between their respective stiffening structure. Specifically, each plate 92 has only a single strengthening channel 102 which is integrally formed into the body of the plate 92 instead of a pair of oppositely opening channels. The transverse dimensions of the channel 102 are such that the channel is completely disposed within the thickness confines of the corrugated plate 92.

The double channels 76 of the second embodiment are designed to function without the aid of any external braces or supports. On the other hand, the single strengthening channel 102 in the third embodiment utilizes an independent brace in the nature of a wood bar 104 for augmenting the strengthening characteristics of the channel 102. The bar 104 is rectangular in cross section and is adapted to fit complementally within the channel 102 against the floor 106 of the latter as shown best in FIG. 15. A series of staple-like fasteners 108 intermittently spaced along the bar 104 pass through the floor 106 into bar 104 to securely affix the latter to the plate 92. It is to be noted that the dimensions of the bar 104 are such that it is entirely received within the channel 102 without projecting beyond the extremities of the ridges 94, thereby once again minimizing impedance to airflow.

As above set forth, the bars 104 are preferably constructed of wood, although other suitable materials may be used. The important factor is that the material used be substantially heat-resistant such that the plate 92 will remain vertically strong in spite of the adverse effects of high temperature water on the thermoplastic material used for the plates 92.

In a further effort to maximize the vertical strength of each unit 90, the bars 102 are provided with extensions 110 at opposite ends thereof which project beyond the upper and lowermost edges 112 and 114, respectively, of the plate 92. Thus, the lower extensions 110 may serve as legs which stand upon a suitable supporting surface to free the lowermost edge 114 from bearing the combined load of the upper portion of the plate and the water during operation. In the alternative, the upper extensions 110 may be suspended from suitable overhead structure (not shown).

It is contemplated that when a number of the units 92 are grouped together to present the packing assembly, the knobs 98 on one unit 90 will not be bonded to the plateaus 100 of the next adjacent unit 92, but instead, will only bear thereagainst. In view of the increased rigidity of each unit 90 because of the addition of the bracing bars 104, such bonding is not necessary.

FIGS. 16–20 relate to a fourth embodiment of the invention wherein the fill unit 120 is substantially identical to the fill previous units except for details of the manner in which the unit 120 is braced. Each plate 122 has a series of single channels 124 integrally formed therewith which complementally receives an elongated brace in the nature of a transversely U-shaped metal bar 126 which extends beyond the upper and lowermost edges 128 and 130 of plate 122, presenting extensions 132. Instead of using the staple-like fasteners 108 employed in the third embodiment, each metal bar 126 is provided with a series of finger-like tabs 134 which are spaced apart longitudinally of the bar 126 and are adapted to be inserted through corresponding openings in the floor 136 of each channel 124. The tabs 134 may then be bent inwardly toward the surface of the bar 126, thereby securely joining the same together. In this manner, the plate 122 is completely supported by the bar 126 when the unit 120 is in use, and the unit 120 may be either suspended from overhead structure (not shown) or supported by the lowermost extensions 132 upon a flat surface in the manner described in the third embodiment.

It should now be apparent that any one of the four embodiments presented herein is especially suited for obtaining the primary goal of the invention. The corrugated nature of each unit exposes the maximum surface area available for coverage by the heated water, and such corrugations may be quickly and easily produced in a vacuum-forming process because of the thinness of the plates. The thin dimension is permitted because of the presence of the stiffeners and bracers. However, the first embodiment is to be preferred, primarily because of the slight tendency of water channelization to occur when the last three embodiments are utilized and additionally, because of the fact that the arrangement of the first embodiment occupies less proportionate area of the fill unit than do the remaining embodiments. Therefore, greater corrugated surface area is exposed to spread the heated water for contact by the cooling air currents. On the other hand, it is important to note that the arrangement taught by the second embodiment requires a minimum of production cost, inasmuch as the integral double-channel configuration may be formed during the same process in which the corrugations are produced.

Having thus described the invention, what is claimed as new and desired to be secured by Letters Patent is:

1. A fill unit for packing in a water cooling tower, said unit comprising:
   a relatively thin, normally upright plate of semirigid material having a pair of opposed sides adapted for coverage by heated water flowing downwardly thereover;
   a plurality of water-contacting corrugations on at least one of said sides; and
   an elongated, normally vertically extending stiffener on the plate confined transversely within the boundaries defined by the outer extremities of the corrugations for increasing the inherent resistance of the plate to horizontal bending without impeding airflow across said corrugations.

2. The fill unit as claimed in claim 1, wherein is provided a stiffener-receiving trough in said one side extending across and through adjacent corrugations.

3. The fill unit as claimed in claim 2, wherein said stiffener has a plurality of laterally extending ledges throughout the length of the stiffener integral therewith and projecting beyond said trough into engagement with the corrugations for supporting the plate.

4. The fill unit as claimed in claim 3, wherein said ledges conform to the configuration of said corrugations and are constructed of initially fluid, curable material bonding the stiffener to the plate.

5. The fill unit as claimed in claim 4, wherein said stiffener includes a substantially rigid roving of fibrous material impregnated with said bonding material.

6. The fill unit as claimed in claim 2, wherein said trough has a series of longitudinally spaced openings communicating said one side of the plate with the opposite side thereof, and wherein is provided an initially fluid, curable bonding material associated with the stiffener for securing the latter to both sides of the plate via said openings.

7. The fill unit as claimed in claim 6, wherein is provided an anchor base on said opposite side of the plate having a surface disposed in alignment with an adjacent opening for receiving a deposit of said fluid bonding material to form an auxiliary retainer integral with the stiffener.

8. The fill unit as claimed in claim 1, wherein said stiffener includes a resin-impregnated, substantially rigid roving of fibrous material bonded to said plate.

9. The fill unit as claimed in claim 8, wherein is provided a roving-receiving trough in said one side of the plate extending across and through adjacent corrugations and having the bottom thereof recessed below said extremities of the corrugations.

10. The fill unit as claimed in claim 9, wherein is provided a plurality of openings in said trough for flow of bonding material for the roving from said one side of the plate onto the opposite side thereof.

11. The fill unit as claimed in claim 1, wherein said stiffener has a pair of elongated, juxtaposed, and oppositely opening strengthening channels integral with the plate and interconnected by a common central wall, said channels extending longitudinally of the stiffener and each having a sidewall joining the channels with proximal corrugations.

12. The fill unit as claimed in claim 11, wherein each of said channels is provided with a floor, said central wall spanning the distance between the floors of the channels and being inclined with respect thereto.

13. The fill unit as claimed in claim 1, wherein at least one normally vertically extending side edge of the plate is inclined with respect to the lowermost edge thereof, said stiffener extending in parallelism with said inclined side edge.

14. The fill unit as claimed in claim 1, wherein said corrugations are arranged in sets of chevron patterns, said stiffener extending transversely of and intersecting a line of weakness presented by the aligned apexes of the converging corrugations in each set.

15. The fill unit as claimed in claim 14, wherein said stiffener is inclined with respect to said line.

16. The fill unit as claimed in claim 1, wherein said stiffener includes an elongated strengthening channel integral with the plate and having a recessed floor, and an elongated, rigid brace complementally received within the channel for augmenting the strengthening properties of the channel, there being means provided for securing the brace to said floor of the channel.

17. The fill unit as claimed in claim 16, wherein said brace has a leg extending beyond the lowermost edge of said plate for supporting the latter.

18. The fill unit as claimed in claim 16, wherein said brace includes a transversely rectangular wood bar, said securing means including a fastener extending through said floor of the channel into the bar and pulling the floor against the bar.

19. The fill unit as claimed in claim 16, wherein said brace comprises a transversely U-shaped metal bar, said securing means including a deformable tab on the bar projecting through the floor of the channel and clasping the latter against the bar.

* * * * *